United States Patent
Canavor et al.

(10) Patent No.: US 8,904,506 B1
(45) Date of Patent: Dec. 2, 2014

(54) DYNAMIC ACCOUNT THROTTLING

(75) Inventors: Darren E. Canavor, Redmond, WA (US); Daniel W. Hitchcock, Bothell, WA (US); Max H. Funderburk, Seattle, WA (US); Robert Hanson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 75 days.

(21) Appl. No.: 13/303,613

(22) Filed: Nov. 23, 2011

(51) Int. Cl.
- *G06F 7/04* (2006.01)
- *G06F 15/16* (2006.01)
- *G06F 17/30* (2006.01)
- *H04L 29/06* (2006.01)

(52) U.S. Cl.
USPC ............................................. 726/7; 713/182

(58) Field of Classification Search
USPC .................................................... 726/7
See application file for complete search history.

(56) References Cited

U.S. PATENT DOCUMENTS

| | | | |
|---|---|---|---|
| 7,523,206 B1* | 4/2009 | Naish et al. | 709/226 |
| 8,281,382 B1* | 10/2012 | Sanyal et al. | 726/9 |
| 2002/0078350 A1* | 6/2002 | Sandhu et al. | 713/168 |
| 2004/0037306 A1* | 2/2004 | Khan et al. | 370/437 |
| 2005/0111460 A1* | 5/2005 | Sahita | 370/395.3 |
| 2005/0273855 A1* | 12/2005 | Oberle et al. | 726/22 |
| 2007/0143851 A1* | 6/2007 | Nicodemus et al. | 726/25 |
| 2009/0037983 A1* | 2/2009 | Chiruvolu et al. | 726/4 |
| 2010/0175103 A1* | 7/2010 | Walter et al. | 726/1 |
| 2010/0223256 A1* | 9/2010 | Chalana et al. | 707/718 |
| 2011/0035505 A1* | 2/2011 | Jakobsson | 709/229 |

OTHER PUBLICATIONS

Liang Xie; pBMDS: A Behavior-based Malware Detection System for Cellphone Devices ; Year: 2010; ACM; pp: 1-12.*

* cited by examiner

*Primary Examiner* — Mohammad W Reza
*Assistant Examiner* — Monjour Rahim
(74) *Attorney, Agent, or Firm* — Sutherland Asbill & Brennan LLP

(57) ABSTRACT

A user account may be throttled to restrict access once aberrant behavior is detected. Upon receiving a request to access the user account, a determination of whether the user account is in a throttled state may be made. In some aspects, when the user account is not in a throttled state, user account access may be determined based at least in part on an access credential. Further, in some aspects, when the user account is in a throttled state, user account access may be determined based at least in part on an access credential and other client information associated with the user account.

31 Claims, 6 Drawing Sheets

DYNAMIC ACCOUNT THROTTLING

BACKGROUND

Many websites require users to log in with identification credentials, such as a username and password, in order to securely identify the users. Hackers and/or other malicious website attackers, however, often attempt to compromise a user's account by repeatedly guessing identification credentials. For example, a hacker may repeatedly submit username/password combinations to a website until access is granted to another's account. Websites may detect such aberrant behavior and throttle the account in order to protect the account and/or the user. However, the actual user of the account may then unnecessarily lose access, leading to an unpleasant experience. As such, finding improved ways to throttle accounts continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
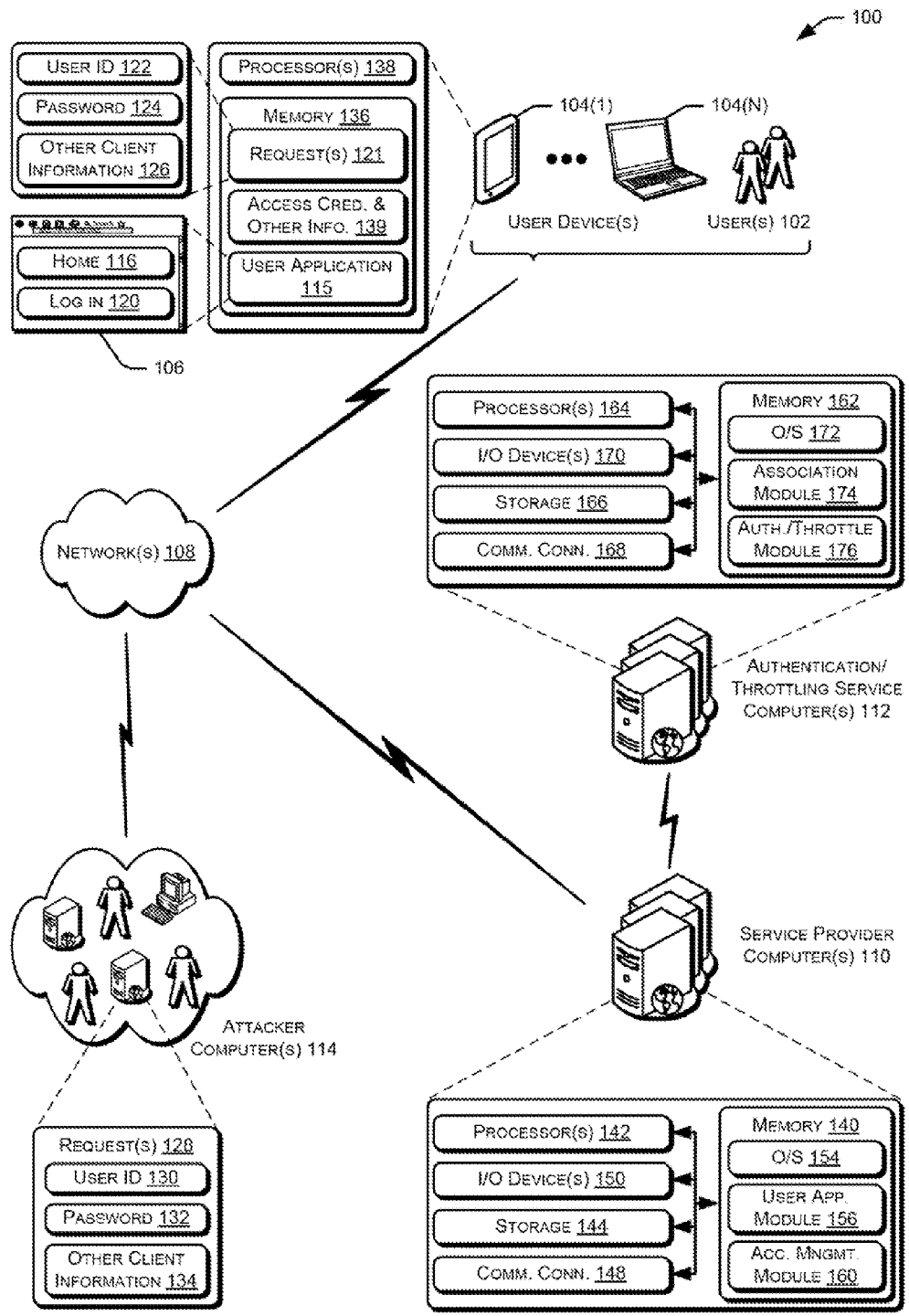
FIG. 1 illustrates an example architecture for dynamically throttling user accounts that includes a service provider computer and one or more user devices and/or attacker computers connected via one or more networks.

Embodiments of the present disclosure are directed to, among other things, providing dynamic throttling for user accounts based at least in part on authentication processes that may include checking and/or verifying access and/or log-in credentials (e.g., usernames and/or passwords). As an overview, an account may include an online merchant account, an auction account, a bank account, a credit card account, a shipping account, a social networking account, or any other type of account to which a user, a group of users, or an entity may log in. While accessible to the user, the account may be provided and/or managed by a service provider such as, but not limited to, a social network site, an online retailer, a payment facilitator, a financial institution, a financial service provider, or other type of website. In some examples, logging in to an account may include a requestor (such as a user) providing a username, a password, a personal identification number (PIN), an answer to a challenge question, a family name, or some other identifier for identifying the requestor as someone associated with the account such as, but not limited to, the account holder or someone associated with the account holder. However, in other examples, the requestor may be a hacker or other attacker with malicious and/or devious intentions.

Additionally, account throttling may include any type or level of control administered to a user account by a service provider. For example, locking an account (i.e., denying access to requestors) and/or not responding to log-in requests after one or more failed log-in attempts within a predefined time period may constitute throttling. Requesting that additional information be provided by a requestor after one or more failed log-in attempts during a predefined period of time may also be considered throttling. Further, in some aspects, throttling may be controlled by the service provider that provides the account to the user or by a third-party authentication service or third-party throttling service.

In some aspects, other client information may be processed when the account is in a throttled state. As desired, different levels of throttling, such as a sliding scale of access or a sliding scale of authentication (or credentialing), may be provided to different requestors based on different levels of association between the requestor and the account. For example, if a requestor has a direct level of association with an account (i.e., the requestor is the account holder), the service provider, authentication service, and/or throttling service may provide full account access to the requestor even while the account is being throttled. Yet, in other examples, if a requestor has no or little association with an account, the service provider, authentication service, and/or throttling service may provide no or restricted account access to the requestor while the account is being throttled even if the requestor has provided the correct log-in information. As desired, other levels of access may fall within full access and no access; for example, access may be frozen or delayed for a predetermined period of time based on an association level. Additionally, the credentials requested for access may vary based on a level of association. For example, at times only a username and password may be requested from the requestor when the access request originates from a computer associated with the user account. Whereas a username, password, and correct response to a challenge question may be requested from the requestor when the access request originates from a computer not associated with the user account.

In some aspects, a service provider computer, such as a server operated by a financial institution, an online merchant, a news publication company, a shipping company, a social networking company, or the like, may receive log-in requests from one or more requestors. The log-in requests may include any combination of identification credentials including, but not limited to, a username, an email address, any other form of user identifier (or identifier of some person or entity affiliated with the user), a password, a one-time password, an authentication token, a passphrase, biometric information, or a motion pattern (e.g., an indication that the requestor's device was shaken in a particular way). In response to the request, the service provider computer may determine whether the password is correct for the account associated with the received username by comparing the password against passwords stored in memory. The service provider computer may then determine whether to provide account access to the requestor. Alternatively, or in addition, the service provider computer may determine whether the account is in a throttled state and/or whether the account should be placed in a throttled state.

In some examples, determining when an account should be placed in a throttled state includes determining a threshold number of failed log-in attempts of a particular account, from one or more requestors, during a predetermined time period. In some scenarios, and possibly based on different security concerns for different types of websites or accounts, a non-acceptable number of consecutive or non-consecutive failed log-in attempts in a relatively short time period may be considered aberrant behavior and/or indicative of a brute force attack, or other type of malicious attack, being attempted by one or more requestors. For example, if the threshold is determined to be ten per minute (i.e., ten or more, or alternatively more than ten, failed log-in attempts within a minute), the service provider computer may place the account in a throttled state in an attempt to stifle the potential attack after the ninth or tenth failed attempt. As desired, and as mentioned above, different accounts or different types of accounts may have different thresholds. For example, a bank account may be considered a higher security risk than a software application store account (or vice versa) and, therefore, may have a lower threshold. As such, and by way of example only, a threshold for a bank account may be along the lines of five failed log-in attempts per thirty seconds while a threshold for a software application store account may be more like fifteen failed log-in attempts per minute.

In some aspects, once an account has been placed in a throttled state, limitations may be placed on some requestors regarding accessing the throttled account. For example, requestors may no longer be able to log in to the account (e.g., the account may be locked), requestors may be informed that they must wait to log in to the account (e.g., the account is frozen for a predetermined period of time), requestors may be asked to provide additional information to log in to the account (e.g., the requestor's mother's maiden name, a favorite number, a favorite color, or a motion pattern associated with a device), and/or other client information such as, but not limited to, location information, cookies, etc., may be requested and/or extracted from the requestor in order to log in to the account.

In some examples, other client information may include a cookie stored on a computing device associated with the requestor, a device identifier (ID) of a computing device associated with the requestor, a location of a computing device associated with the requestor, and/or an Internet Protocol (IP) address of a computing device associated with the requestor. Additionally, the cookie may be a secure cookie, the device ID may be associated with a particular mobile device, the IP address may identify a particular computing device or location, and/or the location information may be determined based at least in part on global positioning system (GPS) coordinates or on information obtained through analyzing methods that employ signal triangulation, time-of-flight, spatial scan, inertial sensing, mechanical linkage, phase difference, direct field sensing, combinations of the foregoing, or the like. Further, in some examples, the cookie may be a persistent identifier that indicates that the service provider is aware of the identity of the requestor and/or the requestor's browser's configuration. For example, any combination of cookies may be utilized to indicate that the software of the requestor is recognized, that the requestor is known and should be given an unlimited amount of account access time, that the requestor is known but should only be given a limited amount of account access time, that the requestor is not known but will be identified in the future based on browser configuration or the like, and/or that the requestor is known, authorized, and/or of a known browser configuration.

In some examples, the service provider may determine that other client information is associated with a requestor (and, thus, appropriately provide access while throttling other access requests) based at least in part on an indication that the cookie is associated with a previous session or account and/or a computing device that has previously logged in successfully, an indication that the device ID is associated with a mobile device that has previously logged in successfully, an indication that the location of the computing device indicates that the computing device is within a predefined distance of a known location of a successful log in to the user account, and/or an indication that the IP address is associated with a previous session, associated with a computing device that has previously logged in successfully, and/or not associated with a blacklisted device.

In one non-limiting example, a hacker may attempt to access a user account by way of a brute force attack. In this example, the brute force attack may involve several or many unsuccessful log-in attempts from one or more attacker computers. Once a threshold of unsuccessful log-in attempts is reached, the user account may be placed in a throttled state. In this way, although the hacker may continue the brute force attack, the hacker may be unable to log in to the user account based on the throttle. That is, even if no notification is provided, the hacker may be blocked from accessing the account even with the correct username and password if the hacker does not have any other client information associated with the account. At the same time, possibly during the brute force attack, or at least after the account has been placed in a throttled state, the account holder may attempt to log in. In order to maintain the throttled state, yet allow access to the account holder, a service provider may request and/or receive other client information from the account holder. The authentication credential may be sent with or without the account holder's input. Additionally, the account holder may be the named account holder or a person operating on the account holder's behalf or with permission of the account holder, such as a family member or friend. For example, the account holder (or client device) may provide an answer to a challenge question, a cookie, a device ID, an IP address, and/or location information. The service provider may then attempt to verify, validate, or otherwise check that the received other client information identifies and/or verifies that the requestor is associated with the account and/or that the requestor is the account holder or someone associated with the account holder. In some instances, if the requestor is identified as being associated with the account and/or if the requestor is identified and/or verified as the account holder or someone associated with the account holder, the requestor may be provided account access even though the account is in a throttled state.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative system or architecture 100 in which techniques for providing dynamic account throttling may be implemented. In architecture 100, one or more users 102 (i.e., account holders) may utilize user computing devices 104(1)-(N) (collectively, user devices 104) to access a website 106, or a user account accessible through the website 106, via one or more networks 108. In some aspects, the website 106 and/or user account may be hosted, managed, and/or provided by a service provider, such as by utilizing one or more service provider computers 110. Additionally, in some aspects, one or more authentication/throttling service computers 112 may be in communication with the service provider computers 110 to provide account access authentication services and/or account throttling services for the service provider computers 110. Further, in some examples, one or more attacker computers 114 may attempt to access the website 106 and/or user accounts of the service provider computers 110 via the networks 108. The one or more attacker computers 114 may be controlled by one or more attackers, hackers, or otherwise malicious entities that may attempt to access or log in to a user's account without authority from the account holder. It should be understood that any functionality described herein may be provided by any of these devices and/or computers, especially by way of the service provider computers 110 and/or the authentication/throttling service computers 112. Additionally, as desired, the service provider computers 110 and authentication/throttling service computers 112 may be the same computers.

In some examples, the networks 108 may include any one or a combination of multiple different types of networks, such as cable networks, the Internet, wireless networks, cellular networks, and other private and/or public networks. While the illustrated example represents the users 102 accessing the website 106 over the networks 108, the described techniques may equally apply in instances where the users 102 interact with a service provider computer 110 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored software applications, etc.).

As described briefly above, the website 106 may allow the users 102 to interact with a service provider computer 110, such as to interact with other users, purchase goods and/or services, or otherwise access a user account hosted by or provided by the service provider computer 110 and associated with the user 102. In some instances, a user 102 may access the website 106 without logging in, such as when browsing and/or reading general content, when reviewing public profiles of other users, or when searching for content to purchase, download, consume, etc. However, in other instances, the service provider computer 110 may request that the user 102 log in to perform specific requests such as, but not limited to, posting comments, interacting and/or connecting with other users, changing user information, purchasing items and/or services, checking-out, accessing private account holder information, or the like.

One or more service provider computers 110, perhaps arranged in a cluster of servers or as a server farm, may host the website 106. Other server architectures may also be used to host the website 106. The website 106 may be capable of handling requests from many users 102 and serving, in response, various user interfaces that can be rendered at the user devices 104. The website 106 can be any type of website that supports user interaction, including social networking sites, online retailers, informational sites, blog sites, search engine sites, news and entertainment sites, and so forth. As discussed above, the described techniques can similarly be implemented outside of the website 106.

In some examples, the website 106 may host a social networking platform for interacting with other users and/or sharing items. Additionally, the website 106 may host an electronic catalog that may include one or more items. An item may include anything that the website 106 offers for viewing, sharing, purchasing, renting, subscribing to, informing, or for some other form of consumption. In some embodiments, the item may be offered for consumption by the website 106, while in other embodiments, the website 106 may host items that others are offering using the website 106. An item can further include a product, a service, a digital download, a news clip, customer-created content (e.g., a customer review), information, some other type of sellable or non-sellable unit, or any combination or bundle thereof.

Logging in to an account may involve providing a username and/or password to authenticate the user 102 as a person or entity that is authorized to access the account, which may include making changes to the account, posting comments, adding content, implementing transactions, etc. In some instances, authentication may be processed, or otherwise verified, by the authentication/throttling service computers 112. However, in some circumstances, the requestor (i.e., a user 102 or a hacker) may provide an invalid password. This may be based on an error by the requestor (in the case where the user of the account has mistyped or forgotten the password), or it may be based on a malicious attempt to hack into the user's account, such as by the one or more attacker computers 114. In any event, occasional log-in errors may be considered normal. However, a particularly large number of failed log-in attempts within a particular period of time may be considered aberrant behavior. As such, the authentication/throttling service computers 112 may determine, based on the aberrant behavior, to throttle the account in order to limit access.

As noted briefly above, varying degrees of throttle may be applied to different types of accounts in different situations. For example, an account may be locked, frozen for a period of time, or placed in a state where additional verification information may be requested. In some examples, when an account is throttled, the service provider computers 110 or website host may not respond to access requests, may respond with an indication that the account is locked, and/or may limit the number of requests received by the requestor. Further, when authentication/throttling service computers 112 are utilized that are separate from the service provider computers 110, throttling may involve an indication for the service provider computers 110 to no longer send access requests to the authentication/throttling service computers 112 from a particular requestor (e.g., one who is being blocked). Additionally, once an account is throttled, different additional levels of throttle and different pieces of authentication information may be requested by the service provider computers 110 for providing to the authentication/throttling service computers 112. For example, once an account is throttled, a first level of throttle (e.g., asking a challenge/security question) may be applied to a first requestor while a second level of throttle (e.g., a five minute timeout) may be applied to a second requestor. Additionally, other client information may be reviewed by the authentication/throttling service computers 112 to identify, verify, or determine if the requestor is (or is likely) associated with the user account, that is, if the requestor is (or is likely) the account holder. Other client information may include, by way of example only, a cookie, an IP address, a device ID, a location, or any other identifier that may indicate the identity of the requestor. In this way, account users may be able to access their accounts even when the accounts are being throttled due to aberrant behavior.

In one non-limiting example, a user 102 may access a website 106 via a user application 115 of at least one of the user devices 104. In some aspects, the user application 115 may be a Web browser, a mobile application, a dedicated application, or any way of accessing the website 106. As such, the user application 115 may provide and receive hypertext markup language (HTML) requests and responses from a server, such as the service provider computers 110. In some examples, the website 106 may be hosted by the service provider computers 110 or any other Web server. The user 102 may visit a home screen 116, where the user 102 may view user profiles, digital content, products, services, information, etc., of the website 106. At this point, the user 102 may not yet be requested to log in or otherwise authenticate that the user 102 is the account holder or is otherwise associated with the account.

However, upon attempting to post a comment or otherwise interact with another user, or upon selecting a product or service to purchase or otherwise consume, the user 102 may select or activate a button, a link, or an icon that results in the user being prompted to "log in" 120. At this point, if the user 102 has not been authenticated in the current session, the user device 104 may prepare and/or provide a request 121 to log in. The request 121 may include a username (hereinafter, "user ID") 122, a password 124, and/or other client information 126 for authenticating the user 102. The user ID 122 and the password 124 may, in some examples, be entered by the user 102 or on behalf of the user 102. In some examples, the other client information 126 may be provided automatically as part of the HTML header; for example, when the other client information 126 is an IP address, a device ID, or a cookie. In other examples, the other client information 126 may be provided in response to a request from the service provider computers 110, in some examples on behalf of the authentication/throttling service computers 112.

Upon receipt of the request 121 to "log in" 120, the service provider computers 110 may determine whether the user 102 is authorized to access the account. Alternatively, in some aspects, the service provider computers 110 may pass the log-in credentials (i.e., the user ID 122, the password 124, and/or the other client information 126) to the authentication/throttling service computers 112 to process the log-in credentials. In this case, once the authentication/throttling service computers 112 authenticate the request 121, the service provider computers 110 may receive a response from the authentication/throttling service computers 112 indicating whether the user 102 is authorized to access the account. In some examples, when the user 102 is authorized to access the account (i.e., the password 124 provided by the user 102 matches a stored password associated with the account and/or the user ID 122), the user 102 may be given access. This may include allowing the user 102 to interact with other users, share content, check out, for example, to purchase items, upload/download content, update user information, etc. Alternatively, if the password 124 does not match a password associated with the account, the user 102 may receive an indication that the user entered the wrong log-in credentials. Additionally, or in the alternative, if the password 124 is incorrect, the authentication/throttling service computers 112 may increment a failed log-in counter for tracking the number of failed log-in attempts for each account. The failed log-in counter may be utilized to determine when to throttle the account.

As described above, in this example, the user 102 may be able to access the user's 102 account by providing the appropriate user ID 122 and a correct password 124, without the authentication/throttling service computers 112 first validating the other client information 126. That is, in some cases (e.g., when the account is not in a throttled state), the user 102 or any requestor may obtain access to the account based on providing the correct log-in credentials. However, in some examples, the account in question may be in a throttled state. In that case, the service provider computers 110 may request, pull, or otherwise receive other client information 126 and then pass them to the authentication/throttling service computers 112 in order to validate the other client information 126 prior to providing account access to the requestor.

In some aspects, as briefly noted above, the authentication/throttling service computers 112 may utilize a failed log-in counter to determine when an account should be placed in throttled state. In some examples, the failed log-in counter may record, store, or otherwise keep track of how many failed log-in attempts have occurred for a particular account. The authentication/throttling service computers 112 may maintain a failed log-in counter for each account and increment the counter upon each log-in request that provides an incorrect password. In some examples, the counter may only increment for consecutive failed log-in attempts. In some examples, the counter may increment for every failed log-in attempt regardless of whether it was consecutive. In still other examples, the counter may increment for a predefined period of time and then may reset to zero. Alternatively, the counter may increment for the predefined time period by decrementing all failed log-in attempts that are older than the predefined time period. In this way, the counter may indicate a number of failed log-in attempts within a moving window of time. In any event, once the threshold is met (e.g., the counter reaches a predefined number during the predefined time period), the account may be placed in a throttled state and/or added to a throttle record for maintaining which accounts are in a throttled state. By way of example only, a throttle record may be a database, list, index, registry, or other data structure for referencing accounts that are in a throttled state. That is, accounts may be added to the throttle record when they are placed in a throttled state and removed from the throttle record when they are taken out of a throttled state. Alternatively, when an account is placed in a throttled state, a throttle flag or other indicator may be set.

In some examples, the determination of the throttle threshold (e.g., the threshold at which an account should be placed in a throttled state), the increment and/or decrement of a failed log-in counter and/or the throttle record may be performed by a throttling service separate from the service provider computers 110, such as with the authentication/throttling service computers 112. For example, the service provider computers 110 may provide information, such as failed log-in attempt data for each account, throttling thresholds for each account, and/or requests for the throttle record, to the authentication/throttling service computers 112. In response, the authentication/throttling service computers 112 may provide a list of accounts in the throttle record and/or an indication of whether particular accounts are found in the throttle record. However, in other aspects, the functions of the authentication/throttling service computers 112 may be performed by the service provider computers 110, for example within a distributed computing environment.

In one non-limiting example, one or more attacker computers 114 may send one or more account access requests 128 to the service provider computers 110. The hackers controlling the attacker computers 114 may utilize software such as an Internet bot, or Web bot, to automatically and repeatedly send the requests 128 from one or more attacker computers 114, such as from a bot network of bot computers. In some cases, owners of computers may not even be aware that a hacker has placed a Web bot on the owner's computers or that the computers are part of a bot network. The account access requests 128 may be sent with a user ID 130 associated with a particular account and a guessed, or randomly generated, password 132. In some cases, other client information 134, such as the IP address of the attacker computer 114, may also be included in the request 128, even if unknown to the hacker.

Additionally, since the hacker may not generally know the correct password associated with the transmitted user ID 130 (e.g., the password 124 provided by the user 102 when the user 102 is the account holder), the attacker computers 114 may send multiple requests (e.g., tens, hundreds, thousands, or more) for the same account (i.e., using the same user ID 130) in a short period of time until the correct password is provided. For example, it may be possible for the service provider computers 110 to receive several thousand requests to log in to a particular account in less than a minute. Fortunately, this aberrant behavior may be detected, such as by the failed log-in counter of the authentication/throttling service computers 112. In response to detection of the aberrant behavior, the particular account may be placed in a throttled state and/or placed in the throttle record.

In another non-limiting example, one or more attacker computers 114 may send an aberrant number of requests 128 that each leads to a failed log-in attempt. Upon detection of the potential attack (or aberrant behavior), the authentication/throttling service computers 112 may place the account in a throttled state and place the account (or an identifier of the account) in the throttle record. Upon receiving a subsequent request from a user 102 to access the account, such as a request from one of the user devices 104 containing a user ID 122, a password 124, and other client information 126, the authentication/throttling service computers 112 may determine whether the other client information 126 indicates that the user 102 making the request is associated with the account. Otherwise, the user 102 may be denied access even though the request contained the correct user ID/password combination. This may prevent a hacker or bot computer from gaining access to the account if it happens to provide the correct password once the account is in a throttled state. However, while this example assumes that the account is already being throttled and/or that the authentication/throttling service computers 112 are aware of the attack, in some cases, the authentication/throttling service computers 112 may first check the throttle record or other throttle indication information (e.g., a throttle flag) to determine if the account in question is in a throttled state.

In this example, the authentication/throttling service computers 112 may attempt to identify whether the user 102 who has sent the subsequent account access request is associated with the account. In some aspects, this may be done by analyzing the other client information 126. As noted above, the other client information 126 may include a cookie, an IP address, a device ID, a location, and/or any other identifying information that may indicate that the request is from a user 102 who is associated with the account. In some aspects, the service provider computers 110 may have placed a cookie (or a secure cookie) on a user device 104 associated with the user 102 during a previous successful log in. In some aspects, a cookie may indicate state information associated with a user account and the user device 104 of the user. For example, when the user 102 previously logged in successfully, the host of the website 106 may have updated a local cookie (i.e., stored at the user device 104) to indicate the last date and/or time of the successful log in. Generally, this may indicate to a website host that a particular user is associated with the computer as well as provide information to the website 106 so that the website 106 may personalize the Web experience for the user 102 and/or maintain the logged in state for the user 102.

As such, when the account is in a throttled state, and the other client information 126 includes a cookie, the authentication/throttling service computers 112 may inspect the cookie to determine if the computing device that sent the log-in request was the same computing device that successfully logged in last (or recently, or at least at some point in the past). If the cookie is authenticated (i.e., the cookie indicates that the user device 104 has previously successfully logged in), the service provider computers 110 may then provide access to the requestor even when the account is in a throttled state. In this way, the actual owner of the account may not be affected by the throttle and/or the fact that the account may be under attack.

In some aspects, the other client information 126 may include an IP address or a device ID. In this example, when the account is in a throttled state, the authentication/throttling service computers 112 may inspect the IP address or the device ID associated with the request to determine if the computing device is associated with the account holder. Similar to the cookie as described above, an IP address or a device ID may indicate a particular computing device. For example, when a computing device accesses a network connection, such as via the Internet, an IP address may be assigned to that computing device for communication purposes. In some aspects, the IP address may be static, in which case, the authentication/throttling service computers 112 may be able to identify the computer across sessions. Alternatively, even when IP addresses are assigned dynamically within a network, the authentication/throttling service computers 112 may still be able to sufficiently identify computing devices by their IP addresses. Alternatively, when the user device 104 is a mobile device such as, but not limited to, a smart phone, a thin client device, a tablet personal computer (PC), or the like, the computing device may communicate over a cellular network that does not provide IP addresses. In this case, the device ID and/or the IP address may be used to identify the device. Example device IDs include, but are not limited to, a vendor ID, a Media Access Control (MAC) address, a telephone number, etc.

As such, the authentication/throttling service computers 112 may store several IP addresses and/or device ID registries, records, and/or indexes. In one example, the known IP addresses and/or device IDs of account holders may be stored. In this example, when the account is throttled and a user 102 requests account access from a device associated with a known account holder's IP address or device ID (e.g., the other client information 126 includes the IP address associated with the account holder or the device ID associated with the account holder), the service provider computers 110 may grant access to that computer, thereby avoiding the throttle.

In addition, the authentication/throttling service computers 112 may also store a record, a registry, or an index that stores the IP addresses and/or device IDs of known bot computers, known bot network computers, and/or known hacker computers. In some examples, this bot record may be updated every so often to remove IP addresses and/or device IDs that may no longer be associated with malicious computers and/or entities. In this example, when the account is throttled and a user 102 requests account access from a computer associated with an IP address or device ID on the bot record (e.g., the other client information 126 includes the IP address or device ID of a computer known to be a bot computer, known to be used within a bot network, and/or known to be controlled by a hacker), the service provider computers 110 may deny access to that computer even if the username and password are correct.

In some aspects, the other client information 126 may include a location. Examples of a location include, but are not limited to, street addresses, names of known places, IP networks, IP sub-networks, latitude and longitude information, GPS information, combinations of the foregoing, or the like. In some examples, location information may be collected by the user device 104 or entered by the user 102. Additionally, in some examples, this location information may not be provided within an HTML header, as a cookie, IP address, and/or device ID may. As such, the service provider computers 110 may request this information from the requesting user device 104 upon receipt of the account access request with the correct username and password if it is determined by the authentication/throttling service computers 112 that the account is in a throttled state. In this example, when the account is in a throttled state, the authentication/throttling service computers 112 may inspect the location information of the requestor to determine if requests are associated with the account (or account holder) or the user device 104 is associated with the account holder or the account. Here, the location information may indicate an association with an account holder. For example, when a user device 104 of the user 102 (e.g., the account holder) accesses a network connection, such as via the Internet, a cellular network, or other type of connection, the user device 104 may access location information available as a feature of the user device 104 and provide that information to the service provider computers 110. The service provider computers 110 may then pass this information to the authentication/throttling service computers 112 for recording the location of the user 102. However, in some instances, prior to any location information being collected and/or stored, the user 102 whose information is to be collected will be notified and given the ability to opt-out prior to any data collection.

In at least one example, the authentication/throttling service computers 112 may also track an account holder's location utilizing a location graph, a chart, or other data structure. This may enable the authentication/throttling service computers 112 to calculate additional possible locations of the account holder or to verify the authenticity of a correct log-in attempt from a certain user device 104. For example, a user 102 may successfully log in to the user's 102 account while located in Atlanta, Ga., and then the service provider computers 110 may receive an attempt to log in to the same account an hour later from a device located in San Diego, Calif. In this example, since it is not physically possible to travel from Atlanta to San Diego in one hour, the authentication/throttling service computers 112 may determine that the second request is not associated with the account holder, even when the log-in credentials are correct, and place the account in a throttled state and/or update the throttle record.

Further, a location graph or record may be formed over time for each account holder (e.g., a user 102) that indicates likely log in locations. For example, if the user 102 regularly logs in, independent of what user device 104 or type of device is used, from a few locations such as, but not limited to, a place of work, a school, a coffee shop, a bar, a park, etc., these locations may be charted or recorded on a graph or in a record, and the authentication/throttling service computers 112 may determine that locations not included in this graph or record may result in denied access, and may carry a lower association value than those within the graph. As such, the service provider computers 110 may request additional authentication, for example, via other client information. In this way, different levels of association may be placed on different locations based on a probability that the account holder would actually log in from those locations.

For example, if it is determined that a request is coming from a location that carries too low a probability of being the account holder, the account may be placed in a throttled state and/or the request may be denied or ignored. For example, several successful log-ins for an account may occur within a five-mile radius during a certain period of time. However, if a subsequent request to log in to this particular account is received from a computer device that is 100 miles away from the previously recorded five-mile radius, the account may be throttled for the requesting computer device. Additionally, in some examples, a lower level of throttle may be placed on the account in this situation to provide for the possibility that the account holder has actually traveled 100 miles. For example, the service provider computers 110 may provide a security question to the requestor such as, but not limited to, asking for the personal identifying information from the requestor or the like. However, as noted above, certain requests that may be outside the realm of physical possibility may be blocked altogether.

Additionally, as briefly noted above, different levels of association may be applied to different association scenarios. For example, in one aspect, a direct association may include instances when the IP address of the requestor is associated with the account holder, the device ID of the requestor is associated with the account holder, and/or the location of the request is associated with a stored previous location of the account holder. In this case, the requestor may be given access to the account even when it is throttled. An indirect association may include instances when the IP address of the requestor is not associated with a record of an unauthorized IP address such as, but not limited to, a bot record and/or when the location of the request is a location within a predetermined distance of a stored previous location of the account holder. In this case, the requestor may be provided limited access and/or may be asked for additional authentication information when the account is throttled. Further, in some aspects, the requestor may not be given account access while the account is throttled because it is determined that there is no association. Examples of non-association may include when the IP address of the requestor is not associated with the account or the account holder, the IP address is found on a bot record, the device ID is not associated with the account or the account holder, a cookie stored on the requestor's computer is not associated with a previous successful log in session, no cookie is stored on the requestor's computer, and/or the location of the request is a location outside a predetermined distance of a previous successful log in session.

In some examples, based on the level of association, different levels of throttle may be applied. For example, in one aspect, a first amount of account access (e.g., a maximum or relative maximum amount) may include allowing the requestor to log in to the account upon request (even when the account is throttled). A second amount of account access (e.g., a limited or relatively limited amount) may include allowing the requestor to log in to the account after a predefined amount of time has passed and/or allowing the request to log in to the account after a condition has been met, and/or no amount of access may include not allowing the requestor to log in to the account. In some instances, the condition to be met in the limited account access scenario may include correctly answering a challenge question and/or correctly providing some personal piece of information such as, but not limited to, a personal identification number (PIN), a birth date, a mother's maiden name, or the like.

As noted above, the architecture 100 may include one or more user devices 104 and one or more attacker computers 114. The user devices 104 or attacker computers 114 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 110 via the networks 108, or via other network connections.

In one illustrative configuration, the user devices 104 may include at least one memory 136 and one or more processing units (or processor(s)) 138. The processor(s) 138 may be implemented as appropriate in hardware, software, firmware, or combinations thereof. Software or firmware implementations of the processor(s) 138 may include computer-executable or machine-executable instructions written in any suitable programming language to perform the various functions described.

Memory 136 may store program instructions that are loadable and executable on the processor(s) 138, as well as data generated during the execution of these programs. Depending on the configuration and type of user device 104, the memory 136 may be volatile (such as random access memory (RAM)) and/or non-volatile (such as read-only memory (ROM), flash memory, etc.). The user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

Turning to the contents of the memory 136 in more detail, the memory 136 may include an operating system and one or more application programs or services for implementing the features disclosed herein including at least a user application 115, such as a Web browser or dedicated software application (e.g., a smart phone application, a tablet application, etc.). The user application 115 may be configured to receive, store, and/or display a website 106 for interacting with the service provider computers 110. Additionally, as noted above, the memory 136 may store access credentials and other client information 139 such as the user ID 122, the password 124, and/or the other client information 126 provided in the request 121. As noted above, the other client information 126 may include information for authenticating the account access request when the account is in a throttled state such as, but not limited to, a device ID, a cookie, an IP address, a location, or the like. In addition, other client information 126 may include a user 102 provided response to a security question or a geographic location obtained by the user device 104.

In some aspects, the service provider computers 110 may be any type of computing devices such as, but not limited to, mobile, desktop, thin-client, and/or cloud computing devices, such as servers. In some examples, the service provider computers 110 may be in communication with the user devices 104, the attacker computers 114, and/or the authentication/throttling service computers 112 via the networks 108, or via other network connections. The service provider computers 110 may include one or more servers, perhaps arranged in a cluster, as a server farm, or as individual servers not associated with one another. These servers may be configured to host a website 106 (or combination of websites) viewable via the user devices 104, the attacker computers 114, or any other user application 115 or Web browser accessible by a user 102. Additionally, in some aspects, the service provider computers 110 may be configured to perform user authentication and/or dynamic throttling by including authentication/throttling service computers 112 as part of an integrated, distributed computing environment.

In one illustrative configuration, the service provider computers 110 may include at least one memory 140 and one or more processing units (or processor(s)) 142. The processor(s) 142 may be implemented as appropriate in hardware, software, firmware, or combinations thereof. Software or firmware implementations of the processor(s) 142 may include computer-executable or machine-executable instructions written in any suitable programming language to perform the various functions described.

The memory 140 may store program instructions that are loadable and executable on the processor(s) 142, as well as data generated during the execution of these programs. Depending on the configuration and type of service provider computers 110, the memory 140 may be volatile (such as random access memory (RAM)) and/or non-volatile (such as read-only memory (ROM), flash memory, etc.). The service provider computers 110 or servers may also include additional storage 144, which may include removable storage and/or non-removable storage. The additional storage 144 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 140 may include multiple different types of memory, such as static random access memory (SRAM), dynamic random access memory (DRAM), or ROM.

The memory 140, the additional storage 144, both removable and non-removable, are all examples of computer-readable storage media. For example, computer-readable storage media may include volatile and non-volatile, removable and non-removable media implemented in any method or technology for storage of information such as computer-readable instructions, data structures, program modules or other data. The memory 140 and the additional storage 144 are all examples of computer storage media.

The service provider computers 110 may also contain communications connection(s) 148 that allow the service provider computers 110 to communicate with a stored database, another computing device or server, user terminals, and/or other devices on the networks 108. The service provider computers 110 may also include input/output (I/O) device(s) 150, such as a keyboard, a mouse, a pen, a voice input device, a touch input device, a display, speakers, a printer, etc.

Turning to the contents of the memory 140 in more detail, the memory 140 may include an operating system (O/S) 154 and one or more application programs or services for implementing the features disclosed herein including a user application module 156 and/or an account management module 160. The user application module 156 may be configured to generate, host, or otherwise provide the website 106 to users 102.

In some examples, the account management module 160 may be configured to maintain, or otherwise store, account information associated with the requested account. The account information may include account holder information, the user ID, the password, acceptable answers to challenge questions, an indication of whether the account is being throttled (when provided by the authentication/throttling service computers 112), etc. The account information may also include personal information associated with the account holder. For example, the account information may include general demographic or personal information such as name, age, address, credit card information, shipping and billing addresses, telephone number, etc., of the account holder. This personal information may be provided by the account holder, such as a user 102, or may be aggregated by the service provider computers 110 or some other service and may typically be maintained in a secure and private manner.

The architecture 100 may also include one or more authentication service computers and/or one or more throttling service computers (described throughout as authentication/ throttling service computers 112). The authentication/throttling service computers 112 may also be any type of computing devices such as, but not limited to, mobile, desktop, thin-client, and/or cloud computing devices, such as servers. In some examples, the authentication/throttling service computers 112 may be in communication with the service provider computers 110 via the networks 108, or via other network connections. The authentication/throttling service computers 112 may include one or more servers, perhaps arranged in a cluster, as a server farm, or as individual servers not associated with one another. These servers may be configured to host, receive, store, and/or process access requests, authentication requests, and/or throttling determination requests from the one or more service provider computers 110. Additionally, these servers may be configured to host, receive, store, and/or process throttling policies and/or registries or records for providing a dynamic throttling service. As noted above, in some instances, this service may be performed for, or at the request of, the service provider computers 110. Additionally, in some aspects, the authentication service and the throttling service may be separate and distinct from one another (and/or implemented on different machines by different providers), while in other aspects, the authentication service and the throttling service may be provided by a single authentication/throttling service computer 112 and/or may be integral to the service provider computer 110. For example, the authentication/throttling service computers 112 may be included with the service provider computers 110 in a single, integrated, distributed computing environment such that the host of the website 106 performs the authentication and/or throttling on its own.

In one illustrative configuration, the authentication/throttling service computers 112 may include at least one memory 162 and one or more processing units (or processor(s)) 164. Similar to that of the service provider computers 110, the processor(s) 164 of the authentication/throttling service computers 112 may be implemented as appropriate in hardware, software, firmware, or combinations thereof. Software or firmware implementations of the processor(s) 164 may include computer-executable or machine-executable instructions written in any suitable programming language to perform the various functions described.

The memory 162 may store program instructions that are loadable and executable on the processor(s) 164, as well as data generated during the execution of these programs. Depending on the configuration and type of authentication/throttling service computers 112, the memory 162 may be volatile (such as random access memory (RAM)) and/or non-volatile (such as read-only memory (ROM), flash memory, etc.). The authentication/throttling service computers 112 or servers may also include additional storage 166, which may include removable storage and/or non-removable storage. The additional storage 166 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 162 may include multiple different types of memory, such as static random access memory (SRAM), dynamic random access memory (DRAM), or ROM.

The memory 162, the additional storage 166, both removable and non-removable, are all examples of computer-readable storage media. For example, computer-readable storage media may include volatile and non-volatile, removable and non-removable media implemented in any method or technology for storage of information such as computer-readable instructions, data structures, program modules or other data. The memory 162 and the additional storage 166 are all examples of computer storage media.

The authentication/throttling service computers 112 may also contain communications connection(s) 168 that allow the authentication/throttling service computers 112 to communicate with a stored database, another computing device or server, user terminals, and/or other devices on the networks 108. The authentication/throttling service computers 112 may also include input/output (I/O) device(s) 170, such as a keyboard, a mouse, a pen, a voice input device, a touch input device, a display, speakers, a printer, etc.

Turning to the contents of the memory 162 in more detail, the memory 162 may include an operating system (O/S) 172 and one or more application programs or services for implementing the features disclosed herein including an association module 174 and/or an authentication/throttling module 176.

In some aspects, the association module 174 may be configured to receive other client information 126 from a user device 104, an attacker computer 114, and/or a service provider computer 110. Based on the received other client information 126, the association module 174 may determine the level of association between the requestor and the account being accessed. As noted above, the association module 174 may determine whether a direct association, an indirection association, or no association exists. Additionally, in some instances, the authentication/throttling module 176 may be configured to determine when to provide account access to a requestor, determine when an account should be placed in a throttled state, and/or determine what level of throttle should be applied. As noted above, the authentication/throttling module 176 may determine whether a first, second, or third level of throttle should be applied. However, more or less than three levels may be defined as desired. A few examples of the operations of the association module 174 are described in greater detail below with reference to FIGS. 2-6.

Additional types of computer storage media that may be present in the service provider computers 110 and/or the authentication/throttling service computers 112 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 110, the authentication/throttling service computers 112, and/or other computing devices. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Illustrative Tools

Figure 2:
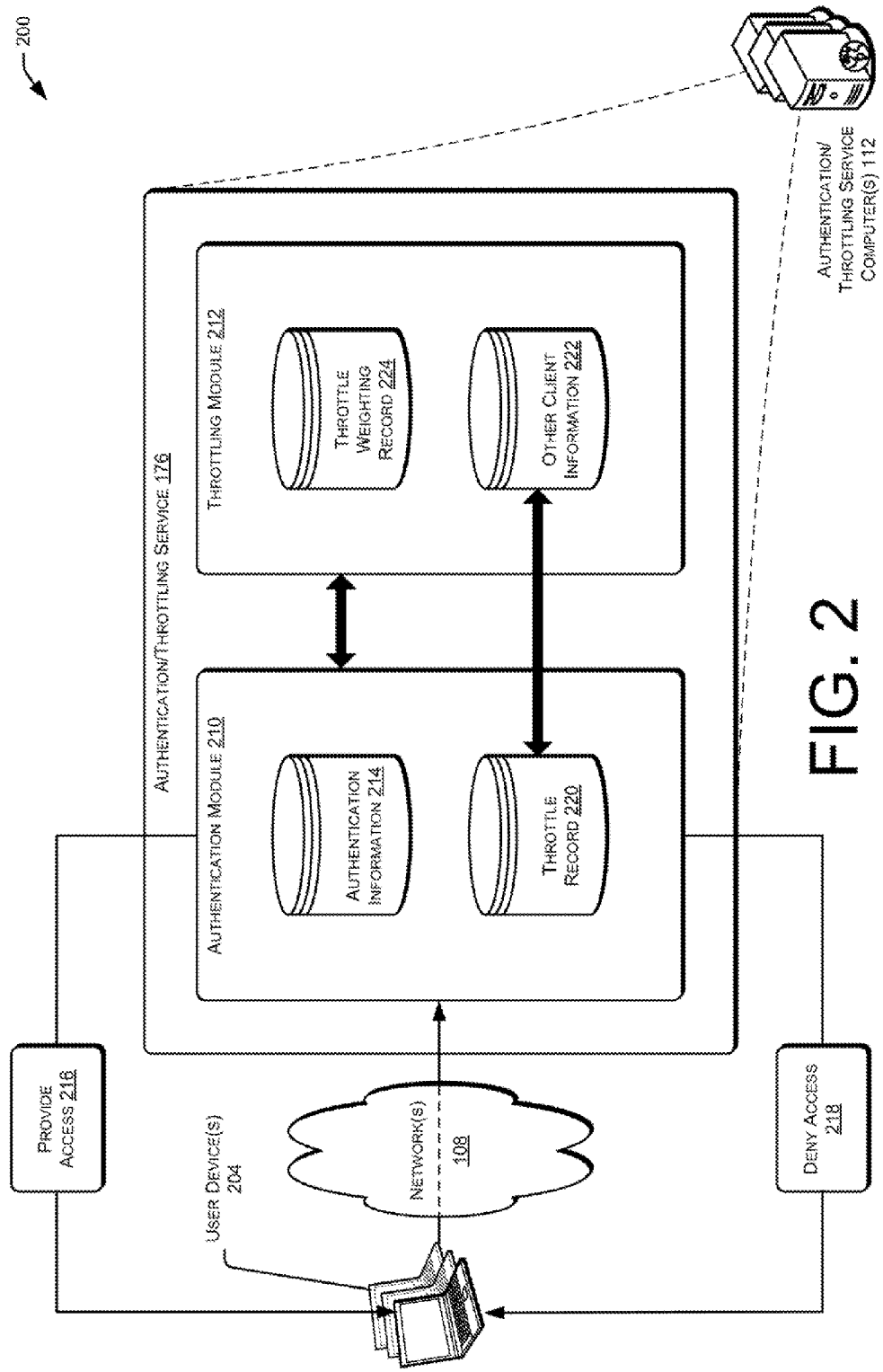
FIG. 2 illustrates an example architecture in which tools for implementing an authentication service for dynamically throttling user accounts may be provided. Here, one or more users may attempt to access a user account of a service provider computer.

FIG. 2 depicts an illustrative architecture 200 in which tools for providing dynamic account throttling may be implemented. In the architecture 200, the authentication/throttling service computers 112 are shown in communication with one or more user devices 204 via the networks 108. Here, the user devices 204 may be authorized user devices (e.g., one or more of the user devices 104 of FIG. 1) or unauthorized user devices (e.g., one or more of the attacker computers 114 of FIG. 1). Similar to the description of FIG. 1, the authentication/throttling service computers 112 may be integrated with or within the service provider computers 110 such as, but not limited to, being part of a distributed computing environment. In this example, access requests may be received directly from the user devices 204. Alternatively, an authentication/throttling service 176 may be a third-party service providing authentication and/or throttling on behalf of the service provider computers 110. In which case, the access requests from the user devices 204 may be received from the service provider computers 110 and passed to the authentication/throttling module 176 of the authentication/throttling service computers 112 for processing. While not shown explicitly in FIG. 2, it is to be understood that the authentication/throttling service 176 may be stored in the memory 162 of FIG. 1.

In some aspects, the authentication/throttling service 176 may include one or more modules such as, but not limited to, an authentication module 210 and/or a throttling module 212. The authentication module 210 may be configured to receive log-in requests from one or more computers and determine when the requestor has provided the correct log-in credential (e.g., a user ID or a password) combination for a particular account. As such, the authentication module 210 may include an authentication information datastore 214 for maintaining user ID and password combinations for each account. For example, a registry, an index, a table, or other data structure may be utilized to organize the user IDs and passwords. In one aspect, for example, when an account is not in a throttled state, the service provider computers 110 may receive a request to log in to the account from a user device 204.

The request may contain a user ID that may identify the account and a password for authentication. In this example, the authentication module 210 may verify that the received password matches a stored password (e.g., stored in the authentication information datastore 214) associated with the account. If the password matches, the authentication module 210 may then allow the user device 204 to access 216 the user account on the service provider computer 110. However, if the password does not match, the authentication module 210 may then deny access 218 to the user device 204. As noted above, denying account access (i.e., throttling the account) may include locking an account, not responding to log-in requests after one or more failed log-in attempts within a predefined time period, requesting that additional information be provided by a requestor after one or more failed log-in attempts during a predefined period of time, combinations of the foregoing, or the like.

The authentication module 210 may be configured to log, record, tally, or otherwise keep track of unsuccessful log-in attempts (e.g., when the received password does not match the stored password for a particular account). In some examples, a few failed log-in attempts may have no effect on the system. However, in some aspects, the authentication/throttling service 176 may place an account in a throttled state once a threshold of failed log-in attempts is reached (e.g., a predetermined number during a predetermined period of time). For example, the authentication module 210 may also maintain a throttle record 220. When the authentication module 210 determines that an account should be placed in a throttled state, an account identifier such as, but not limited to, the user ID may be stored in the throttle record 220. Alternatively, in some examples, the throttling module 212 maintains the rules or procedures for determining when to place an account in the throttle record 220. In this example, the throttling module 212 will instruct the authentication module 210 on which accounts to add or to remove from the throttle record 220. Alternatively, the throttling module 212 may set a throttle flag or other indicator to indicate that the account is in a throttled state.

Accounts may be placed in the throttle record 220 in various scenarios. For example, an account may be placed in the throttle record 220 after the number of failed log-in attempts reaches a predefined threshold for a predefined time period. In one instance, the threshold may be ten failed log-in attempts per minute or even per second. In other instances, the threshold may be ten consecutive failed log-in attempts over a longer period, say thirty minutes. As desired, any threshold may be utilized that may mitigate potential brute force attacks. Further, in some aspects, the service provider computers 110 may first check the throttle record 220 in response to a log-in request from a user device 204 before even checking the password. In some instances, for example, when the account is being throttled, a correct password may not be enough to provide access. That is, when an account is determined to be on the throttle record, the authentication/throttling service computers 112 may verify other client information before first determining whether to grant or deny access.

As such, the throttling module 212 may include other client information datastore 222 for storing other client information of known account holders. In this way, when an account is recorded in the throttle record 220, the other client information of the requestor may be passed from the authentication module 210 to the throttling module 212 for verification. The other client information datastore 222 may include a registry, a record, a table, a chart, or other record of other client information. Additionally, other client information may include the IP addresses of known account holders, device IDs of known account holders, answers to security or challenge questions, cookie information associated with known account holders, and/or location information associated with known account holders. Further, the throttling module 212 may also include a throttle weighting record 224 for maintaining a record, a registry, a table, a chart, or other record of IP addresses, device IDs, and/or locations associated with accounts that either are not throttled but may be watched for aberrant behavior or are associated with known hackers, attackers, or other malicious entities. Such records are sometimes referred to, or include, a bot list or a blacklist. In some instances, information in the throttle weighting record 224 and the other client information datastore 222 may be updated as new information becomes available.

In one non-limiting example, the authentication/throttling service computers 112 may receive a request from a first one of the user devices 204. The request may include a user ID that identifies an account and a password. The authentication/throttling service computers 112 may compare the received user ID and password against information stored in the authentication information datastore 214 and determine that the password is incorrect. The authentication module 210 may, for a variety of reasons, deny access 218 to the first one of the user devices 204 by providing a time-out, transmitting a notification of incorrect log-in credentials, or by not responding to the request. In some examples, this failed log-in attempt may be associated with a malicious attempt to hack into the account. Additionally, the authentication module 210 may record the failed log-in attempt and/or information associated with the requestor such as, but not limited to, the IP address, the location, the time of the request, etc. Alternatively, upon the failed log-in attempt, the throttling module 212 may receive this information from the authentication module 210 to be stored in a datastore, a registry, a chart, and/or a memory location of the throttling module 212.

Continuing the same example, upon receipt of more failed log-in attempts for this particular account, from the same first one of the user devices 204 or from more than one user device 204, the throttling module 212 may determine that a threshold was met and that the account should be placed in a throttled state. In this case, an account identifier may be recorded in the throttle record 220 or a throttle flag may be set for the account. Further, and after the account is in a throttled state, the authentication/throttling service computers 112 may receive another request from a second, or other, one of the user devices 204, this time with the correct password. In some examples, this log-in attempt may be from the account holder. However, upon checking the throttle record 220, the authentication/throttling service computers 112 may determine that the requested account is throttled. In this case, the authentication/throttling service computers 112 may compare other client information of the requestor against those of the other client information datastore 222 and/or a throttle weighting record 224 associated with the requested account. If a match exists in the other client information datastore 222 or if the requestor's information is not found on the throttle weighting record 224, then the authentication/throttling service computers 112 may provide access 216 to the second user device 204 even though the account is being throttled. In this way, aberrant behavior may trigger throttling of an account; however, access to that account may still be granted to the account holder given that the account holder or the user device 204 provides a valid or appropriately associated other client information.

Various instructions, methods and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architectures, tools, and computing devices shown in FIGS. 1 and 2 are provided by way of example only. Numerous other operating environments, system architectures, and device configurations are possible. Accordingly, embodiments of the present disclosure should not be construed as being limited to any particular operating environment, system architecture, or device configuration.

Illustrative Processes

FIGS. 3-6 are flow diagrams showing respective processes 300, 400, and 600 for providing dynamic account throttling. These processes are illustrated as logical flow diagrams, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Figure 3:
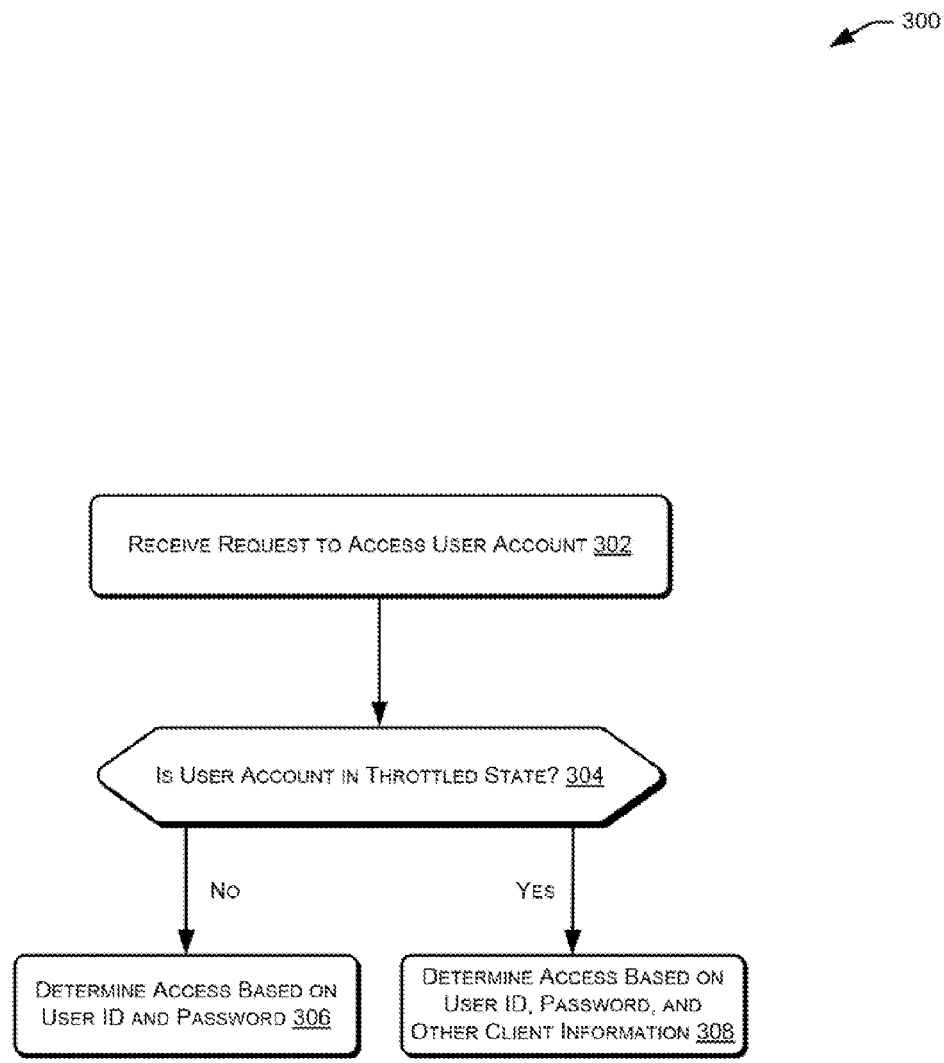
FIGS. 3-6 illustrate example flow diagrams of example processes for enabling dynamic account throttling.

Specifically, FIG. 3 illustrates an example flow diagram of process 300 for dynamically throttling account access, as discussed above. The process 300 may begin by receiving a request to access a user account at 302. In some aspects, the request may be received by a service provider, such as the one or more service provider computers 110 and/or authentication/throttling service computers 112 described in FIGS. 1 and 2. Additionally, the request may be sent from a device associated with the account holder or from a device associated with a hacker or other malicious entity. Further, the request may include a user ID to identify the account for which access is being requested, a password for validating that the requestor is authorized to access the account, and/or other client information that may provide additional assurance or probability that the requestor is authorized to access the account.

At 304, the process 300 may determine whether the user account is in a throttled state. A throttled state may be due to aberrant or malicious behavior directed at the user account and may be determined by reading a throttle record, or other data structure for storing account identifiers of accounts that have been throttled. If, at 304, the process 300 determines that the user account is not in a throttled state, then the process 300 may determine access to the account based on a received user ID and password at 306. That is, when the account is not throttled, access may be granted, determined, or denied based on the authenticity of the password. In this example, the user account may not be under attack by a hacker. However, in the alternative, if the process 300 determines that the user account is in a throttled state at 304, then the process 300 may determine access to the account based on the user ID, the password, and other client information at 308. That is, when the account is throttled, and possibly under attack, access may be granted or denied based on the authenticity of both the password and the other client information.

Figure 4:
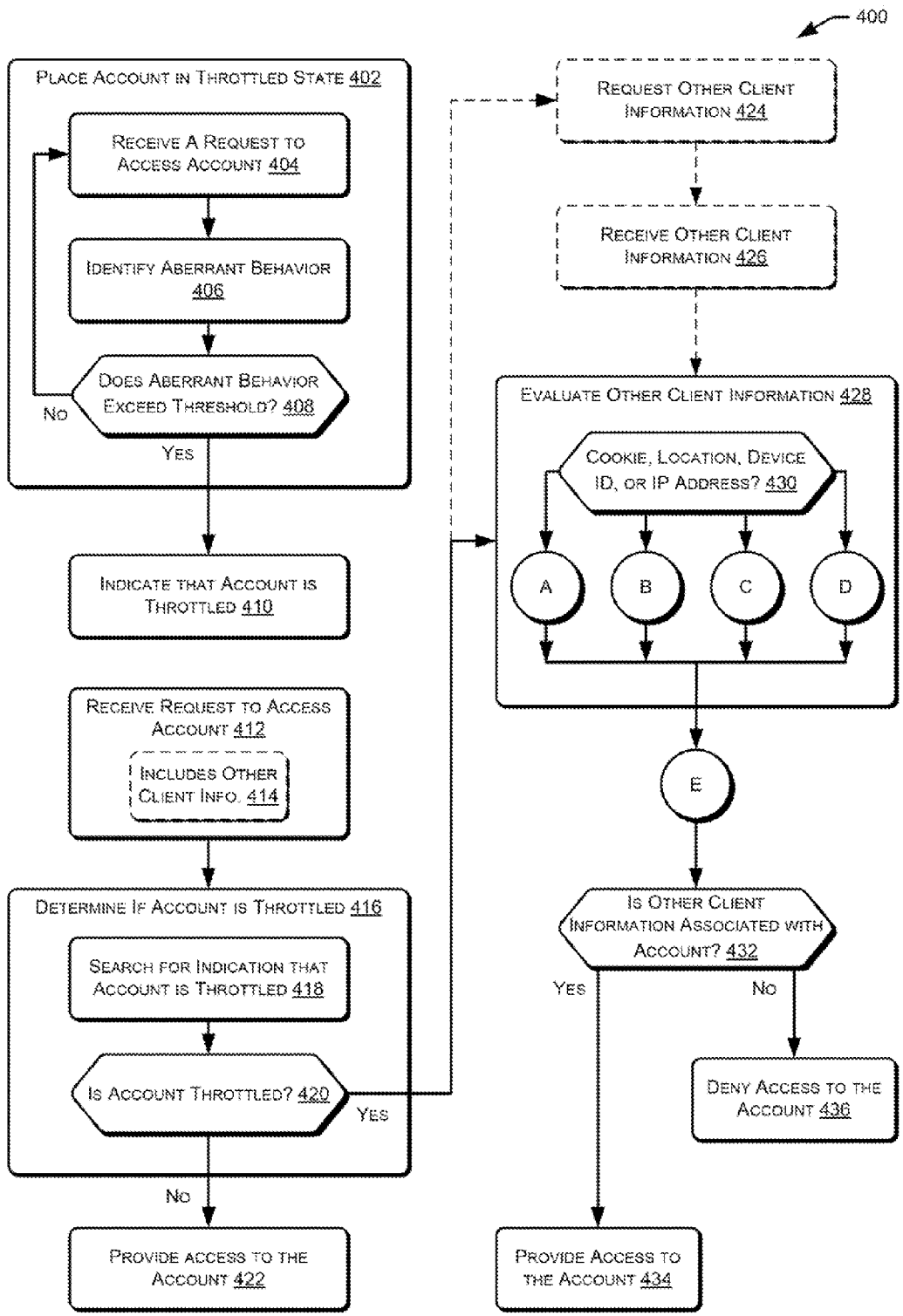

FIG. 4 illustrates an example flow diagram of process 400 for dynamically throttling account access. As discussed, this process 400 may, but need not, be implemented by a service provider such as with the service provider computers 110 and/or the authentication/throttling service computers 112 of FIGS. 1 and 2. The process 400 may begin by placing an account in a throttled state at 402. As described above, the determination to place the account in a throttled state may be based on several criteria including, but not limited to, aberrant behavior associated with log-in attempts for the account. In some aspects, placing the account in the throttled state at 402 may involve receiving a request to access the account at 404, identifying aberrant behavior (e.g., a large amount of log-in attempts in a short period of time) at 406, and determining whether the amount of aberrant behavior exceeds the threshold at 408. In some examples, the request may include a user ID, a password, and/or other client information. When a received password matches a stored password associated with the received user ID, the requestor may be granted access to the account. However, when the password fails to match the password stored for the account, the number of failed log-in attempts may increase. At 408, if an amount of aberrant behavior does not exceed the threshold (in some examples, ten failed attempts in a short time period may be the threshold while in other examples, one hundred successful attempts in the same time period may be the threshold), then the process 400 may return to 404 to continue receiving requests to access the account. However, if the amount of aberrant behavior exceeds the threshold at 408, then the process 400 may end by indicating that the account is throttled by adding the account to a throttle record and/or setting a throttle flag for the account at 410. As described above, in some examples, the throttle record or throttle flag may be stored in the memory 140 associated with the service provider computers 110 of FIG. 1.

In some examples, once the account has been placed in the throttled state at 402, and added to the throttle record or had its throttle flag set at 410, then the process 400 may receive one or more subsequent requests to access the account at 412. Alternatively, receiving a request to access the account at 412 may begin a new process and/or may be independent of what occurred between 402 and 410. In some aspects, the request may include other client information at 414. The process 400 may then determine whether the account is being throttled at 416 by searching and/or reading the throttle record or throttle flags for an indication that the account is throttled (e.g., searching for an identifier of the account in the throttle record or searching a record of accounts for a set throttle flag) at 418. If the account is not being throttled (i.e., the account is not found on the throttle record) at 420, then the process may end by providing access to the account at 422. That is, if the account is not being throttled, then a requestor may receive access to the account based on providing an accurate password. In some examples, providing account access may include preparing and/or transmitting a Web page to a user device such as, but not limited to, sending the website 106 to the user device 104 of FIG. 1.

On the other hand, if the account is being throttled (i.e., the account is found on the throttle record) at 420, then the process 400 may either request other client information from the requestor at 424 or evaluate the other client information at 428. In some examples, the request for access to the account received at 412 may include other client information, such as a cookie, an IP address, or a device ID, or it may not include the other client information desired for evaluation. For example, if the other client information includes location information, then that information may not have been provided as part of a standard Hypertext Transfer Protocol (HTTP) header, and the process 400 may request it from the requestor at 424. In this case, the process may then receive the other client information at 426 and proceed to evaluating the other client information at 428. The process 400 may determine how to evaluate the other client information based at least in part on whether a cookie, a location, a device ID, or an IP address is to be used, or was provided, as the other client information at 430. The process 400 may proceed to "A" of FIG. 5 when a cookie is to be evaluated, to "B" of FIG. 5 when location is to be evaluated, to "C" of FIG. 5 when a device ID is to be evaluated, or "D" of FIG. 5 when an IP address is to be evaluated. As desired, multiple portions of other client information can be evaluated. Additionally, a probability score may be generated based at least in part on one or more (including combinations) portions, pieces, or parts of the other client information. In some aspects, the probability score may be compared to a threshold to determine whether to provide access to the requestor when in a throttled state.

Figure 5:
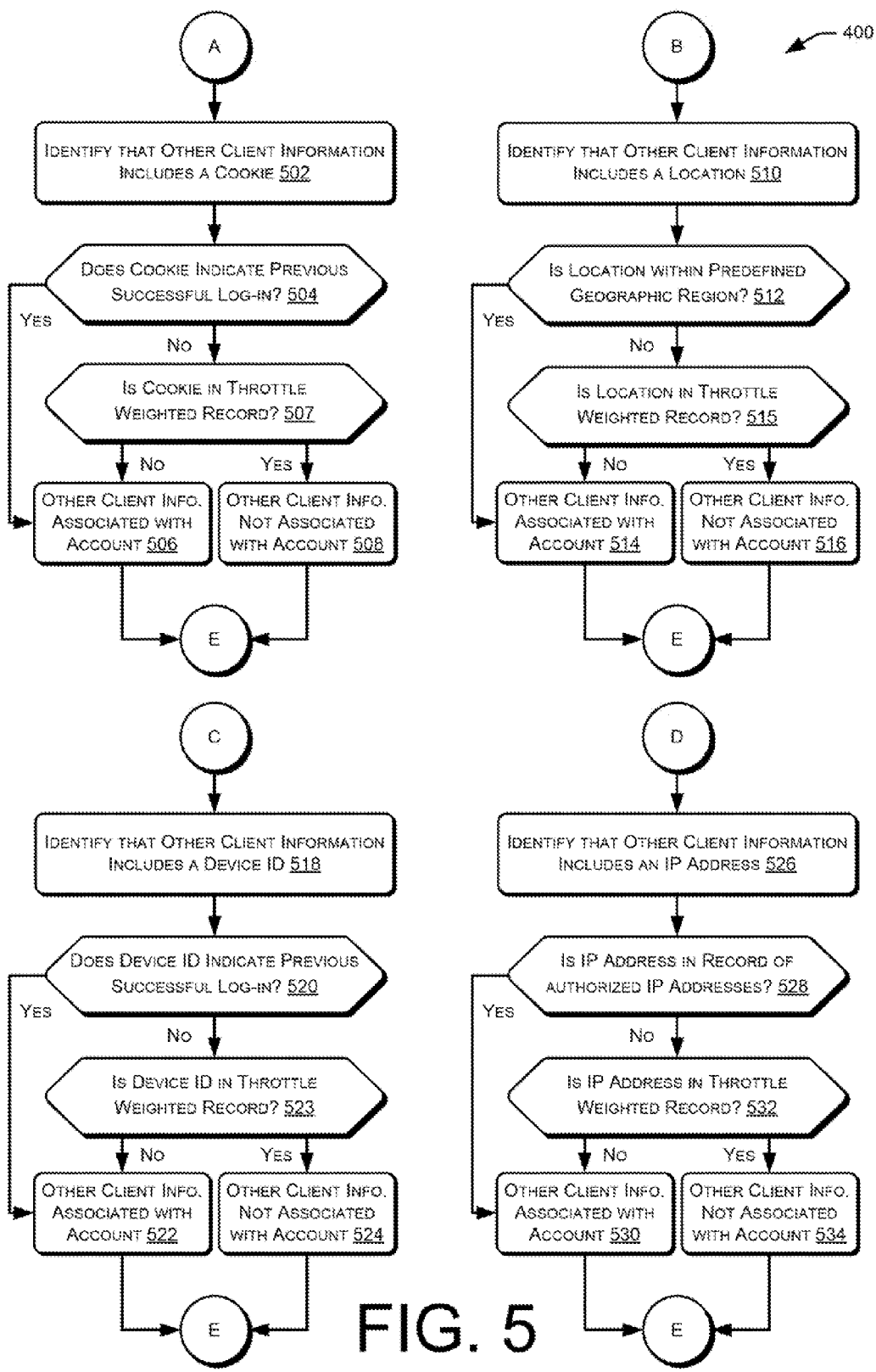

FIG. 5 illustrates at least four examples of how the process 400 will evaluate other client information. However, other examples and/or types of other client information may be possible. By way of example only, following from "A" of FIG. 4 to "A" of FIG. 5, the process may identify the other client information to include a cookie at 502. In some examples, the cookie may be a secure or unsecure cookie that may have been placed in a memory location of the account holder's computer during a previous session. That is, the cookie may verify that the last log in was successful or otherwise identify the account holder. At 504, the process 400 may determine whether the cookie indicates that the previous log in was successful, whether the cookie indicates that the requestor is currently logged in, or whether the cookie indicates that the requesting device is otherwise associated with the account holder. If so, then the process 400 may determine and/or indicate that the other client information is associated with the account and/or the requestor at 506 and then proceed to "E" of FIG. 4.

If, however, the process 400 determines that the cookie does not indicate a previous successful log-in at 504, the process 400 may then determine whether the cookie is recorded in a throttle weighted record at 507. For example, and as described above, a cookie associated with a known hacker, known attacker, and/or of a known Web bot computer may be stored in a throttle weighted record. As such, if the process 400 determines that the cookie is not recorded in the throttle weighted record at 507, then the process 400 may determine and/or indicate that the other client information is associated with the account and/or the requestor at 506 and then proceed to "E" of FIG. 4. On the other hand, however, if the process 400 determines that the cookie is recorded in the throttle weighted record (i.e., the requestor may be a hacker or sending requests from a bot computer), then the process 400 may determine and/or indicate that the other client information is not associated with the account and/or the requestor at 508 and then proceed to "E" of FIG. 4.

Similarly, following from "B" of FIG. 4 to "B" of FIG. 5, the process 400 may identify the other client information to include a location at 510. In some examples, the location information may indicate from where the request was sent. As noted above, this information may be based on a GPS device, a network connection, or the like. At 512, the process 400 may determine whether the location is within a predefined geographic region, area, zone, or the like. Alternatively, or in addition, the process 400 may also determine whether the location is the same as, or is associated with, a location from which the account holder has previously logged in. If so, then the process 400 may determine and/or indicate that the other client information is associated with the account and/or the requestor at 514 and then proceed to "E" of FIG. 4.

If, however, the process 400 determines that the location does not indicate that the location is within a predefined geographic region, area, zone, etc., or is the same as a location from which the account holder has previously logged in at 512, the process 400 may then determine whether the location is recorded in a throttle weighted record at 515. For example, and as described above, a location associated with a known hacker, known attacker, and/or of a known Web bot computer may be stored in a throttle weighted record. As such, if the process 400 determines that the location is not recorded in the throttle weighted record at 515, then the process 400 may determine and/or indicate that the other client information is associated with the account and/or the requestor at 514 and then proceed to "E" of FIG. 4. On the other hand, however, if the process 400 determines that the location is recorded in the throttle weighted record (i.e., the requestor may be a hacker or sending requests from a bot computer), then the process 400 may determine and/or indicate that the other client information is not associated with the account and/or the requestor at 516 and then proceed to "E" of FIG. 4.

In another example, following from "C" of FIG. 4 to "C" of FIG. 5, the process 400 may identify the other client information to include a device ID at 518. In some examples, the device ID may indicate a mobile device from where the request was sent. As noted above, this information may be hard coded into the device and/or pre-assigned by the manufacturer or network provider. At 520, the process 400 may determine whether the device ID indicates a previous successful log in. That is, if the mobile device belongs to the account holder, and the account holder has previously logged in using this particular mobile device, then the previous log in may have been successful. If the process 400 determines that the device ID does indicate a previous successful log in, then the process 400 may determine and/or indicate that the other client information is associated with the account and/or the requestor at 522 and then proceed to "E" of FIG. 4.

If, however, the process 400 determines that the device ID does not indicate a previous successful log in at 520, the process 400 may then determine whether the device ID is recorded in a throttle weighted record at 523. For example, and as described above, a device ID associated with a known hacker, a known attacker, and/or a known Web bot computer may be stored in a throttle weighted record. As such, if the process 400 determines that the device ID is not recorded in the throttle weighted record at 523, then the process 400 may determine and/or indicate that the other client information is associated with the account and/or the requestor at 522 and then proceed to "E" of FIG. 4. On the other hand, however, if the process 400 determines that the device ID is recorded in the throttle weighted record (i.e., the requestor may be a hacker or sending requests from a bot computer), then the process 400 may determine and/or indicate that the other client information is not associated with the account and/or the requestor at 524 and then proceed to "E" of FIG. 4.

In yet another example, following from "D" of FIG. 4 to "D" of FIG. 5, the process 400 may identify the other client information to include an IP address at 526. In some examples, the IP address may indicate a computing device from where the request was sent. As noted above, this information may be statically or dynamically assigned by the network with which it is connected. At 528, the process 400 may determine whether the received IP address is recorded in a record of authorized IP addresses. That is, in some cases, the account holder may have previously successfully logged in from this particular IP address and that IP address may be saved in an authorized IP address record. If the process 400 determines at 528 that the IP address is recorded in a record of authorized IP addresses, then the process 400 may determine and/or indicate that the other client information is associated with the account and/or the requestor at 530 and then proceed to "E" of FIG. 4.

If, however, the process 400 determines that the IP address is not recorded in an authorized IP record at 528, the process 400 may then determine whether the IP address is recorded in a throttle weighted record at 532. For example, and as described above, the IP addresses of known hackers, known attackers, and/or of known Web bot computers may be stored in a throttle weighted record. As such, if the process 400 determines that the IP address is not recorded in the throttle weighted record at 532, then the process may determine and/or indicate that the other client information is associated with the account and/or the requestor at 530 and then proceed to "E" of FIG. 4. On the other hand, however, if the process 400 determines that the IP address is recorded in the throttle weighted record (i.e., the requestor may be a hacker or sending requests from a bot computer), then the process 400 may determine and/or indicate that the other client information is not associated with the account and/or the requestor at 534 and then proceed to "E" of FIG. 4.

Returning to FIG. 4, upon evaluating the other client information at 428, the process 400 may continue at "E" and then determine whether the other client information is associated with the account or the requestor at 432. In some examples, as discussed with reference to FIG. 5, this determination may already be made. Additionally, in some examples, this determination may be processed by the authentication module 210 and/or the throttling module 212 of FIG. 2 associated with the one or more service provider computers 110 of FIGS. 1 and 2. In some instances, if the process 400 determines that the other client information is associated with the account and/or the requestor at 432, then the process 400 may end by providing account access to the requestor at 434. Alternatively, if the process 400 determines that the other client information is not associated with the account and/or the requestor, then the process 400 may end by denying account access to the requestor at 436.

Figure 6:
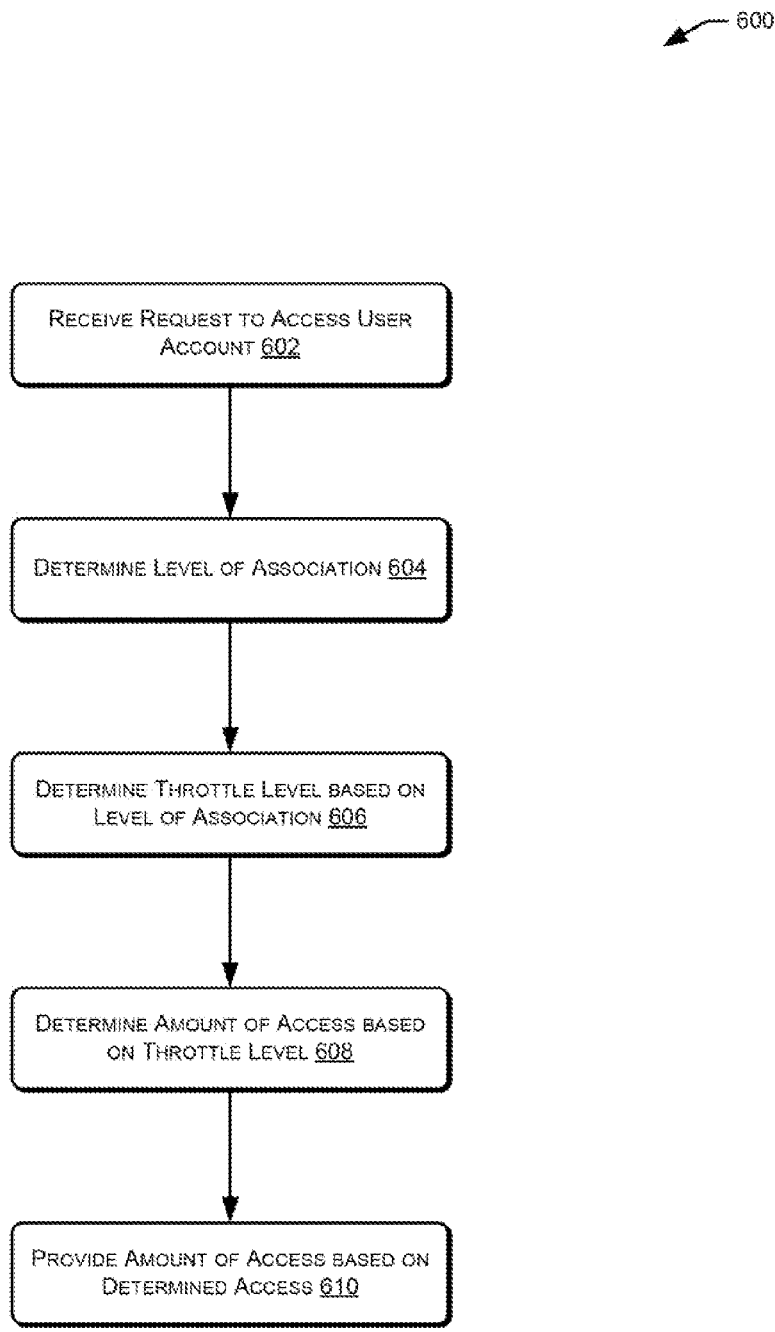

FIG. 6 illustrates an example flow diagram of process 600 for dynamically throttling account access, as discussed above. The process 600 may begin by receiving a request to access a user account at 602. In some aspects, the request may be received by a service provider, such as the one or more service provider computers 110 and/or authentication/throttling service computers 112 described in FIGS. 1 and 2. Additionally, the request may be sent from a device associated with the account holder or from a device associated with a hacker or other malicious entity. Further, the request may include a user ID to identify the account for which access is being requested, a password for validating that the requestor is authorized to access the account, and/or other client information that may provide additional assurance or probability that the requestor is authorized to access the account.

At 604, the process 600 may determine a level of association between a requestor and the requested user account. As noted above, a first level of association may include knowledge that the requestor is directly associated with the account, a second level of association may include knowledge that the requestor may be associated with the account, and/or a third level of association (e.g., no association) may include knowledge that the requestor is not associated with the account. At 606, the process 600 may determine a throttle level for the requestor's computing device based at least in part on the determined level of association. For example, a requestor determined to be within the first level of association may receive a lower level of throttle (i.e., more access) than a requestor determined to be within the second or third levels of association. The process 600 may then determine an amount of access of the user account to be provided to the requestor based at least in part on the determined throttle level at 608. For example, and as briefly noted above, a lower level of throttle may equate to a higher amount of access to be provided to the requestor and a higher level of throttle may equate to a lower amount of access provided to the requestor. In some examples, the process 600 may then end by providing (or denying) access to the requestor based at least in part on the determined access rights at 610.

Illustrative methods and systems for providing dynamic account throttling are described above. Some or all of these systems and methods may, but need not, be implemented at least partially by architectures such as those shown in FIGS. 1-6 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments That which is claimed:

1. A system, comprising:
at least one memory that stores computer-executable instructions; and
at least one processor configured to access the at least one memory, wherein the at least one processor is configured to execute the computer-executable instructions to:
receive a first request to log in to a user account;
place the user account in a throttled state based at least in part on the first request;
receive, on behalf of a user and while the user account is in the throttled state, a second request to log in to the user account, the second request including valid authentication credentials for the user account;
authenticate the user based at least in part on the valid authentication credentials;
evaluate other client information associated with the second request to determine that the other client information is associated with the user account; and
provide the user with access to the user account while the user account is in the throttled state responsive to a determination that the other client information is associated with the user account.

2. The system of claim 1, wherein the authentication credentials comprise a user identifier (ID) and a password.

3. The system of claim 1, wherein the at least one processor is further configured to execute the computer-executable instructions to:
determine that the first request comprises invalid authentication credentials; and
place the user account in the throttled state based at least in part on the determination that the first request comprises invalid authentication credentials.

4. The system of claim 1, wherein the other client information comprises at least one of: (i) a cookie stored on a computing device associated with the second request, (ii) a device identifier (ID) associated with the computing device associated with the second request, (iii) a location of the computing device associated with the second request, or (iv) an Internet Protocol (IP) address associated with the computing device associated with the second request.

5. The system of claim 4, wherein the at least one processor is configured to evaluate the other client information to determine that the other client information is associated with the user account based at least in part on at least one of: (i) an indication that the cookie is associated with a previous session with the user account, (ii) an indication that the computing device on which the cookie is stored is associated with a successful log in request received prior to the first request or the second request, (iii) an indication that the device ID is associated with a mobile device associated with the successful log in request received prior to the first request or the second request, (iv) an indication that the location of the computing device indicates that the computing device is within a predefined distance of a known location associated with a successful log in to the user account, (v) an indication that the IP address is associated with a previous session with the user account, or (vi) an indication that the computing device with which the IP address is associated is associated with the successful log in request received prior to the first request or the second request.

6. A method, comprising:
receiving, by one or more computers comprising one or more processors, from a computing device and on behalf of a user, a request to access an online user account, the request including authentication credentials;
authenticating, by the one or more computers, the user based at least in part on the authentication credentials;
determining, by the one or more computers, that the online user account is in a throttled state;
identifying, by the one or more computers, other client information associated with the computing device;
determining, by the one or more computers, that the other client information is associated with the online user account; and
providing, by the one or more computers, the computing device with access to the online user account while the online user account is in the throttled state responsive to a determination that the other client information is associated with the online user account.

7. The method of claim 6, further comprising placing, by the one or more computers, the online user account in the throttled state.

8. The method of claim 7, further comprising determining, by the one or more computers, that a number of failed log-in attempts for the online user account meets or exceeds a predefined threshold, wherein the online user account is placed in the throttled state based at least in part on determining that the number of failed log-in attempts meets or exceeds the predefined threshold.

9. The method of claim 6, wherein determining that the online user account is in the throttled state comprises identifying the online user account in a record of throttled accounts or identifying that a throttle flag has been set for the online user account.

10. The method of claim 6, further comprising:
requesting, by the one or more computers, from the computing device, the other client information when the online user account is in the throttled state; and
receiving, by the one or more computers and based at least in part in response to the requesting, the other client information from the computing device.

11. The method of claim 6, wherein the request to access the online user account comprises the client information.

12. The method of claim 6, wherein the other client information comprises at least one of a cookie stored on the computing device, a device ID of the computing device, a location of the computing device, or an Internet Protocol (IP) address of the computing device.

13. The method of claim 12, wherein the other client information comprises the cookie stored on the computing device, and wherein determining that the other client information is associated with the online user account comprises determining that the cookie is associated with the online user account responsive to a determination that the cookie indicates that the computing device successfully logged in to the online user account prior to receipt of the request to access the online user account.

14. The method of claim 12, wherein the other client information comprises the device ID of the computing device, and wherein determining that the other client information is associated with the online user account comprises determining that the device ID is associated with the online user account responsive to a determination that the device ID exists in a record of device IDs associated with computing devices that have successfully logged in to the online user account prior to receipt of the request to access the online user account.

15. The method of claim 12, wherein the other client information comprises the location of the computing device, and wherein determining that the other client information is associated with the online user account comprises determining that the location is associated with the online user account responsive to a determination that the location is within a predefined geographic region.

16. The method of claim 15, wherein the predefined geographic region is identified based at least in part on a record of one or more locations of the computing device stored in memory.

17. The method of claim 12, wherein the other client information comprises the Internet Protocol (IP) address of the computing device, and wherein determining that the other client information is associated with the online user account comprises determining that the IP address is associated with the online user account responsive to a determination that the IP address is not associated with a record of unauthorized computing devices.

18. The method of claim 12, wherein the other client information comprises the Internet Protocol (IP) address of the computing device, and wherein determining that the other client information is associated with the online user account comprises determining that the IP address is associated with the online user account responsive to a determination that the IP address is associated with a record of authorized computing devices.

19. A method, comprising:
receiving, by one or more computers comprising one or more processors, a request to access a user account;
determining, by the one or more computers, that the user account is in a throttled state; and
responsive to a determination that the user account is in the throttled state, determining whether access is to be granted to the user account while the user account is in the throttled state based at least in part on the authentication credentials and other client information associated with the user account.

20. The method of claim 19, wherein the request comprises at least one of: (i) the authentication credentials or (ii) the other client information.

21. The method of claim 19, wherein the other client information comprises at least one of: (i) a cookie, (ii) a device ID, (iii) an Internet Protocol (IP) address, or (iv) a location identifier.

22. The method of claim 19, wherein determining whether the user account is in a throttled state comprises at least one of: (i) querying a throttle record, (ii) determining whether a threshold number of unsuccessful log-in attempts for the user account has been reached, or (iii) determining whether a throttle flag is set.

23. One or more non-transitory computer-readable media storing computer-executable instructions that, responsive to execution by at least one processor, configure the at least one processor to perform operations comprising:
receiving, from a computing device, a request to access a user account;
determining a level of association between the computing device and the user account;
determining a throttle level for the computing device based at least in part on the level of association between the computing device and the user account;
determining a level of access to the user account based at least in part on the throttle level; and
providing the level of access to the user account to the computing device.

24. The one or more computer-readable media of claim 23, wherein the request comprises authentication credentials and other client information associated with the computing device.

25. The one or more computer-readable media of claim 24, wherein the other client information comprises at least one of: (i) a cookie stored on the computing device, (ii) a device identifier (ID) of the computing device, (iii) a location of the computing device, or (iv) an Internet Protocol (IP) address of the computing device.

26. The one or more computer-readable media of claim 23, wherein the level of association between the computing device and the user account comprises one of: (i) a direct association, (ii) an indirect association, or (iii) a non-association.

27. The one or more computer-readable media of claim 26, wherein the level of association comprises the direct association, and wherein the direct association is determined based at least in part on at least one of: (i) an indication that an Internet Protocol (IP) address of the computing device is associated with the user account, (ii) an indication that a device identifier (ID) of the computing device is associated with the user account, (iii) an indication that a cookie stored on the computing device is associated with a previous session with the user account, or (iv) an indication that a location of the computing device corresponds to a stored location associated with a previous session with the user account.

28. The one or more computer-readable media of claim 26, wherein the level of association comprises the indirect association, and wherein the indirect association is determined based at least in part on at least one of: (i) an indication that an IP address of the computing device is not associated with a record of unauthorized IP addresses or (ii) an indication that a location of the computing device corresponds to a location within a predetermined distance of a stored location associated with a previous session with the user account.

29. The one or more computer-readable media of claim 26, wherein the level of association comprises the non-association, and wherein the non-association is determined based at least in part on at least one of: (i) an indication that an Internet Protocol (IP) address of the computing device is not associated with the user account, (ii) an indication that the IP address of the computing device is associated with a record of unauthorized IP addresses, (iii) an indication that a device identifier (ID) of the computing device is not associated with the user account, (iv) an indication that a cookie stored on the computing device is not associated with a previous session with the user account, or (v) an indication that a location of the computing device comprises a location outside a predetermined distance of a stored location associated with a previous session with the user account.

30. The one or more computer-readable media of claim 23, wherein the level of access to the user account comprises one of: (i) a first level of access, (ii) a second level of access that provides the computing device with less access to the user account than the first level of access, or (iii) a third level of access that provides the computing device with no access to the user account.

31. The one or more computer-readable media of claim 30, wherein the first level of access comprises allowing the computing device to log in to the user account upon request, wherein the second level of access comprises one of: (i) allowing the computing device to log in to the user account after a predefined amount of time has passed from receipt of the request or (ii) allowing the computing device to log in to the user account responsive to a determination that an access condition has been met, and wherein the third level of access comprises not allowing the computing device to log in to the user account.

* * * * *